C. OBENAUER.
SHIPPING CRATE FOR EGGS.
APPLICATION FILED JAN. 20, 1914.

1,106,235.

Patented Aug. 4, 1914.

Witnesses
W. R. Smith
Edward Jeager

Inventor
C. Obenauer.
By Victor J. Evans
Attorney

UNITED STATES PATENT OFFICE.

CHARLES OBENAUER, OF BINGHAMTON, NEW YORK.

SHIPPING-CRATE FOR EGGS.

1,106,235.   Specification of Letters Patent.   Patented Aug. 4, 1914.

Application filed January 20, 1914. Serial No. 813,273.

*To all whom it may concern:*

Be it known that I, CHARLES OBENAUER, a citizen of the United States, residing at Binghamton, in the county of Broome and State of New York, have invented new and useful Improvements in Shipping-Crates for Eggs, of which the following is a specification.

The general object of this invention is the provision of a shipping crate of simple construction and by means of which eggs may be conveniently transported with the least possibility of breaking or otherwise damaging the same.

To this end the invention consists essentially of a casing within which is removably arranged a tray from which rises a plurality of spaced pairs of companion egg carrying loops for firmly supporting the eggs individually.

Another important object of the invention is the provision of a device of the above mentioned character with means to prevent sliding movement or tilting of the frame within the casing which would obviously result in damaging the eggs when the latter came in contact with the side walls or top of the casing.

With these and other objects in view which will appear as the nature of the invention is better understood, the same consists in the combination, construction and arrangement of parts hereinafter more fully described and pointed out in the appended claim.

Figure 1:
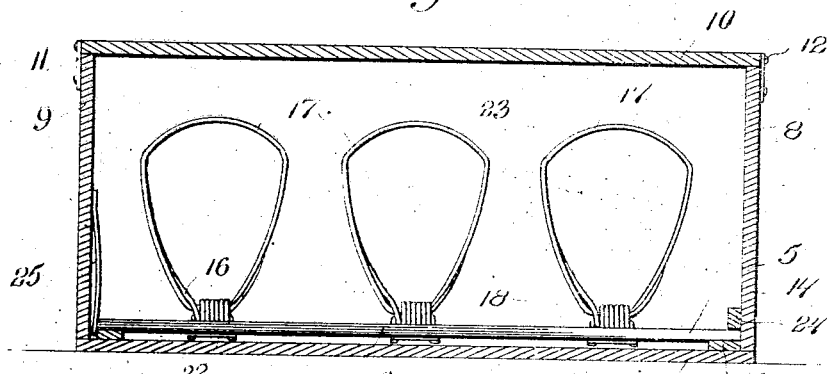
Figure 2:
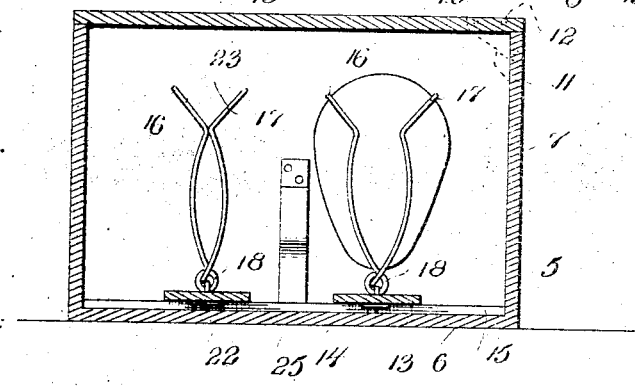
Figure 4:
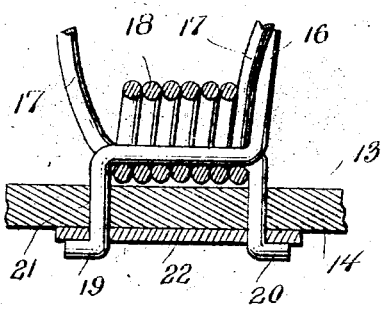
Figure 3:
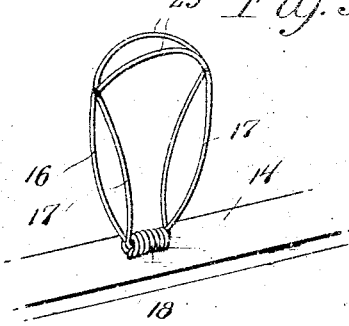

In the drawing forming a part of this application and in which like numerals of reference indicate similar parts in the several views; Figure 1 is a longitudinal sectional view through the casing with the tray in position therein. Fig. 2 is a vertical sectional view. Fig. 3 is a perspective view of one pair of the egg supporting loops. Fig. 4 is a front elevation of the egg supporting loops partly in section.

Referring to the drawing by numerals 5 designates a casing constructed of any suitable material, and of any required size, comprising a bottom 6 side walls 7 and end walls 8 and 9. The casing is provided with a cover 10 hinged thereto by means of the substantially triangular plates 11 which are secured to the edges of the cover as at 12 and pivotally connected to the opposite ends of the casing as shown. Removably arranged within the casing and resting upon the bottom thereof is a tray 13 of a size approximately equal to that of the bottom 6 so as to snugly fit within the casing. The tray consists of a plurality of spaced longitudinally disposed strips 14 which are connected by means of the transverse bars 15 at their opposite ends. Rising from the strips 14 at suitable points are spaced pairs of "companion" spring loops 16 and 17 between which the eggs are firmly supported individually. Each pair of spring loops are formed from a single length of resilient material preferably wire, by bending the wire midway of its length to provide the spring coils 18. The wire at one side of the coil is bent to form the loop 16 the free end of which is passed through the coil 18 from the opposite end thereof as shown and terminates to provide an attaching portion 19. The wire at the opposite side of the coil 18 is then bent to provide a similarly constructed loop 17 which is passed through the loop 16 so that the said loops will normally contact each other under the tension of the spring coil 18. The free end of the loop 17 is passed through the coil 18 from the opposite side and terminates to provide an attaching portion 20 similar to the attaching portion 19 of the loop 16. The attaching portions 19 and 20 are passed through suitable openings 21 in the strips 14 and through the plates 22 secured to the undersurface of the said strips 14 and bent outwardly in engagement therewith. The prongs may if desired be soldered or otherwise firmly secured to the plates 22. The cross piece 23 of each loop is curved upwardly and outwardly to provide a flared entrance passage to facilitate the insertion of the egg between the loops.

With a view of preventing sliding movement or tilting of the frame within the casing, which would of course result in the breaking or cracking of the eggs by coming in contact with the side walls and top of the casing, I employ means including a cleat 24 secured in any suitable manner to the end wall 8 and spaced above the bottom 6 a distance substantially equal to the combined thickness of the strips 14 and cross bars 15 so that one end of the frame will snugly fit in the space between the cleat and bottom 6. Secured to the opposite end wall 9 is the upper end of a vertically disposed flat spring 25 which is bowed or curved inwardly from its upper to its lower end which is slightly spaced above the bottom 6 to permit the spring to straighten out upon insertion of the tray within the casing. The spring 25 operates to retain the tray immovably positioned within the casing by bearing against one end thereof, thus holding the opposite end in position below the cleat 24.

The device is extremely simple in construction, and readily and easily manipulated for the purpose intended. The tray may be readily removed from the casing by simply lifting up on the end adjacent the spring 25. After the eggs have been properly positioned between the loops 16 and 17 one end of the tray is placed beneath the cleat 24 and the opposite end forced down in position upon the bottom against the tension of the spring 24 which in turn operates to firmly support the tray against movement within the casing. The cover 10 is then closed and locked in any suitable manner, after which the casing and its contents is ready for shipment.

From the foregoing description taken in connection with the accompanying drawing it is believed that the nature and advantages of the invention will be thoroughly understood without further explanation, and therefore the same has been omitted. However I desire to have it understood that while I have shown and described the preferred form of my invention, I am not to be limited to the precise construction herein shown, as various changes may be made within the scope of the appended claims without sacrificing any advantages of the invention.

What is claimed is:

An egg carrier comprising a single length of wire bent intermediate its length to form a spring coil, the terminals of the wire at each end of the coil being extended in the direction of the opposite ends of the coil to provide companion loops normally contacting each other, the free ends of the loop being passed in opposite directions through the coil and bent to provide means for securing the carrier to a support.

In testimony whereof I affix my signature in presence of witnesses.

CHARLES OBENAUER.

Witnesses:
 DOUGLAS V. ASHLEY,
 BERTHA M. HUNT,
 HENRY C. OLMSTED.